Aug. 27, 1968  P. C. VINCENT  3,398,727
ROTARY INTERNAL COMBUSTION ENGINES
Filed Feb. 1, 1967  9 Sheets-Sheet 6
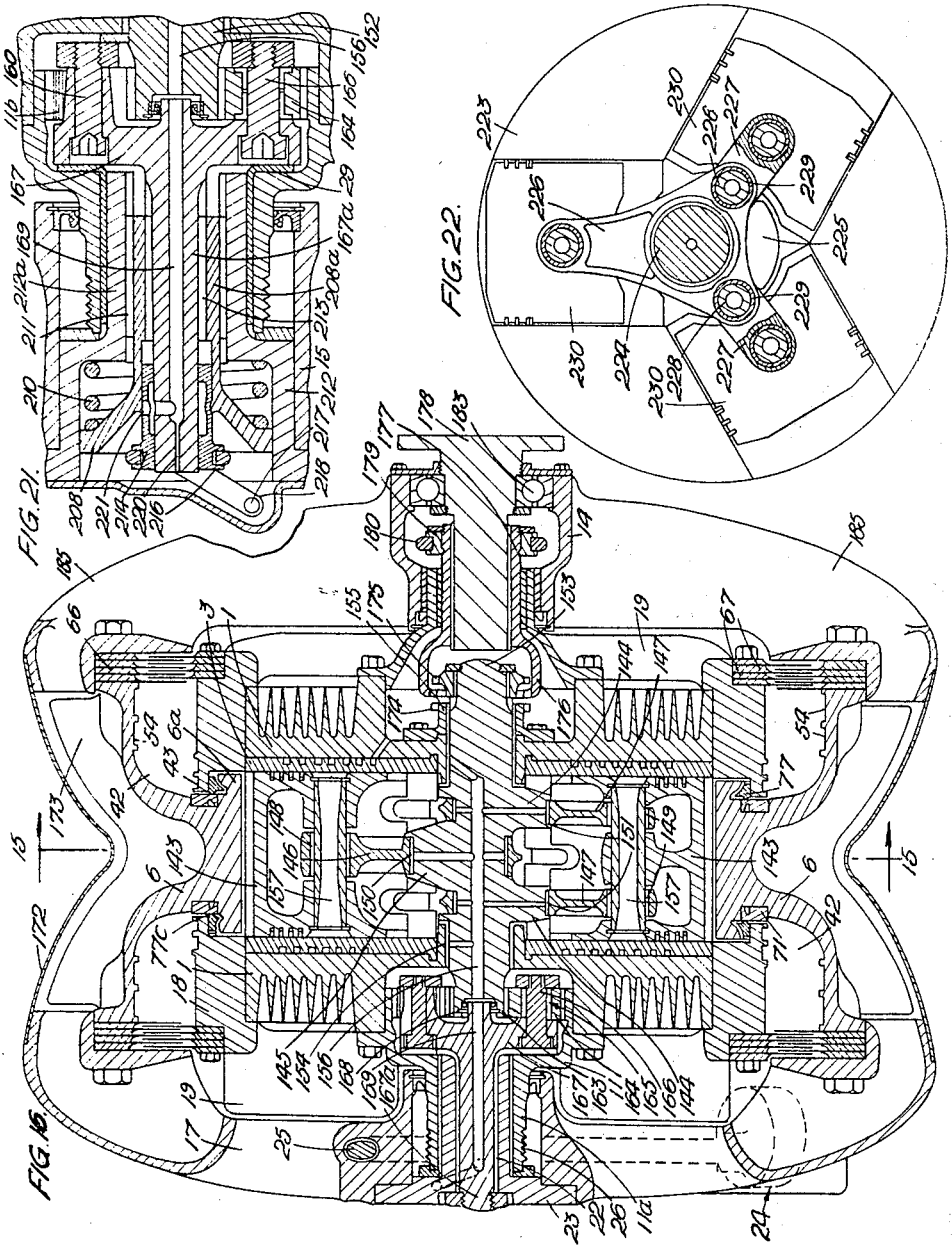

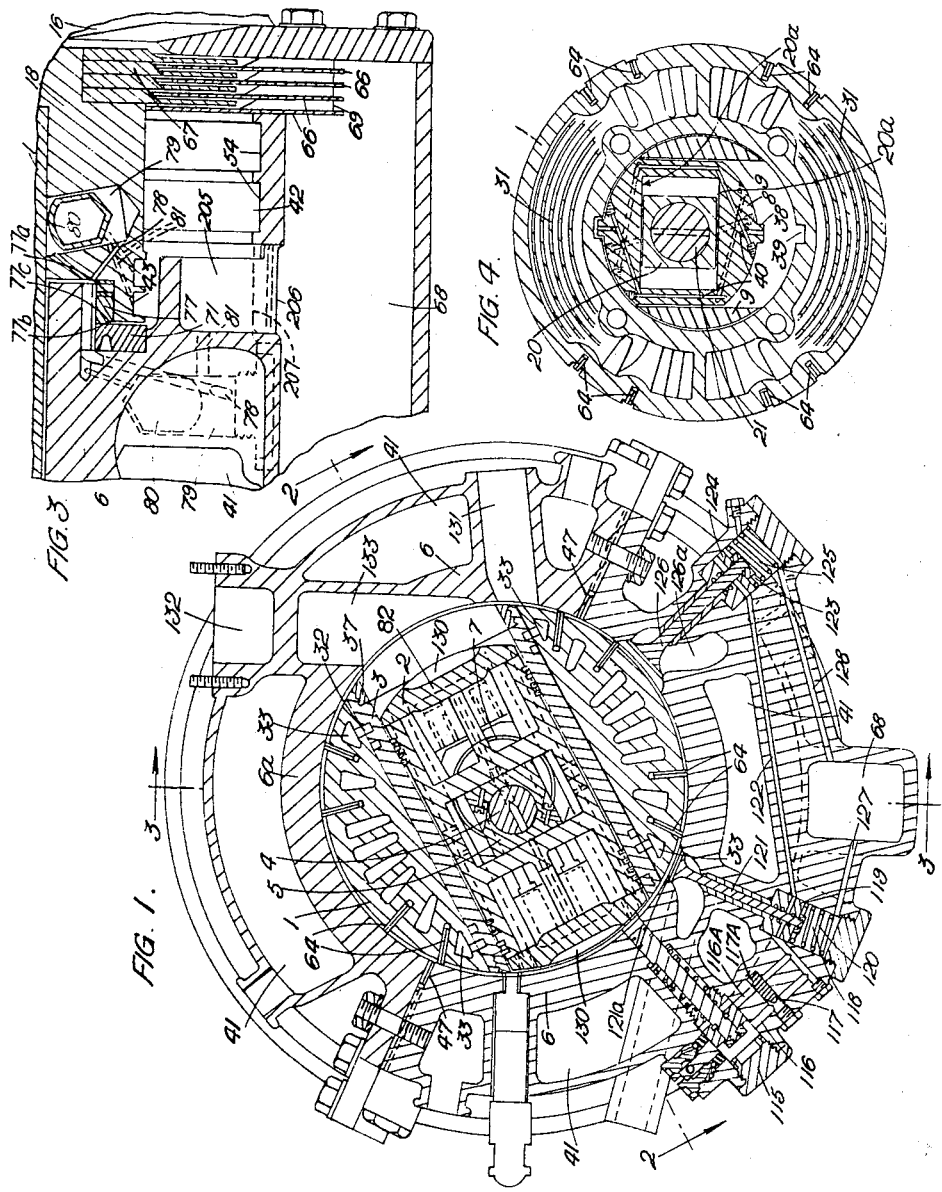

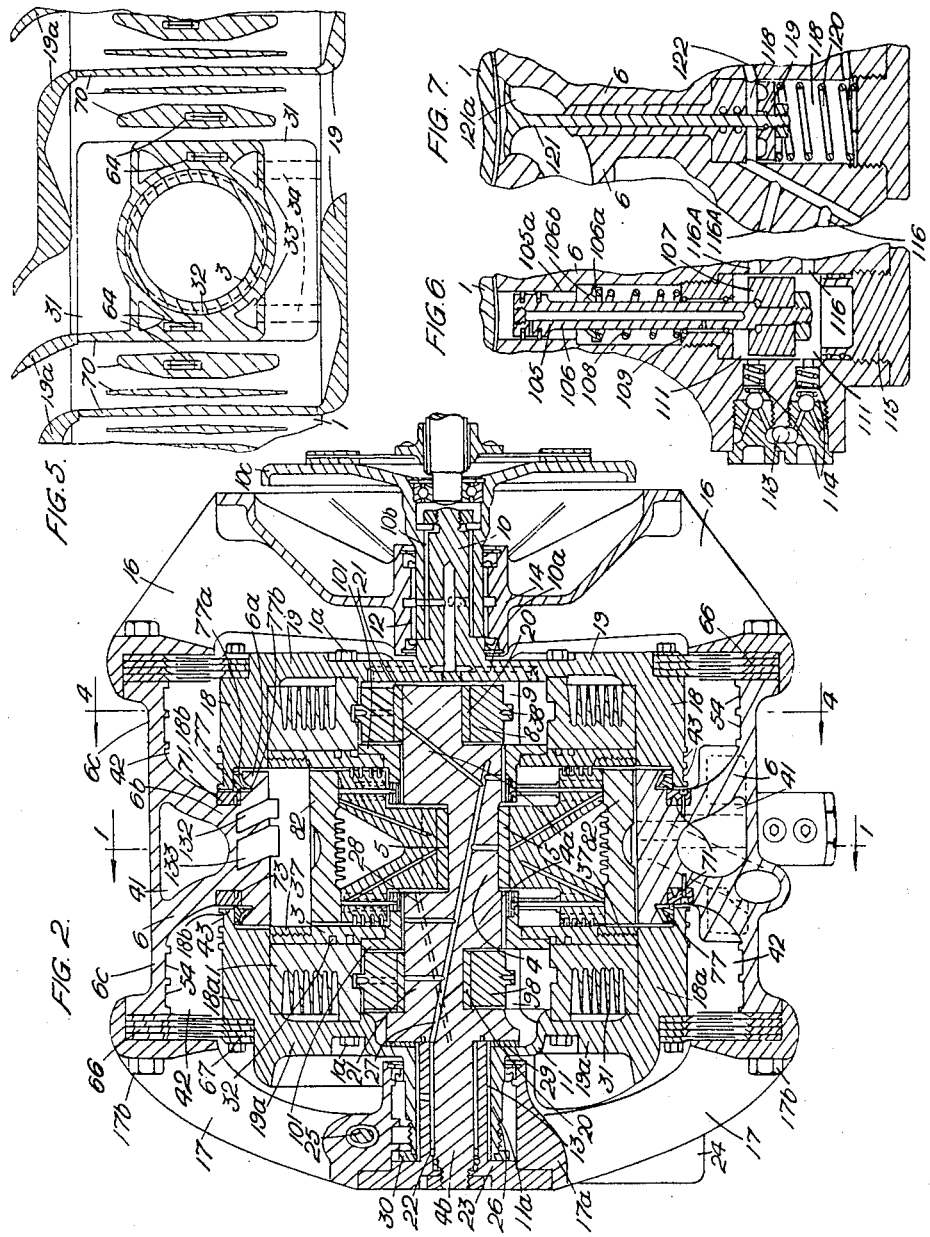

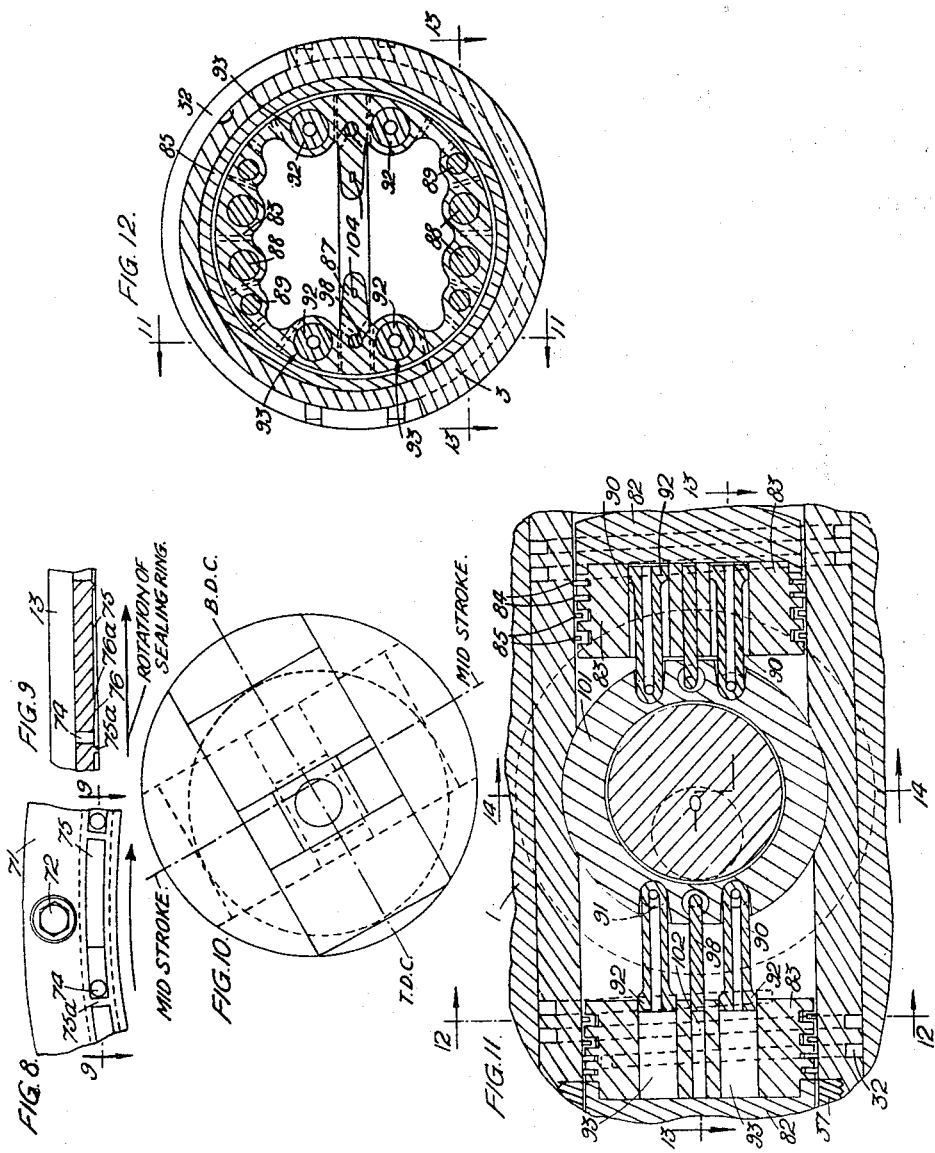

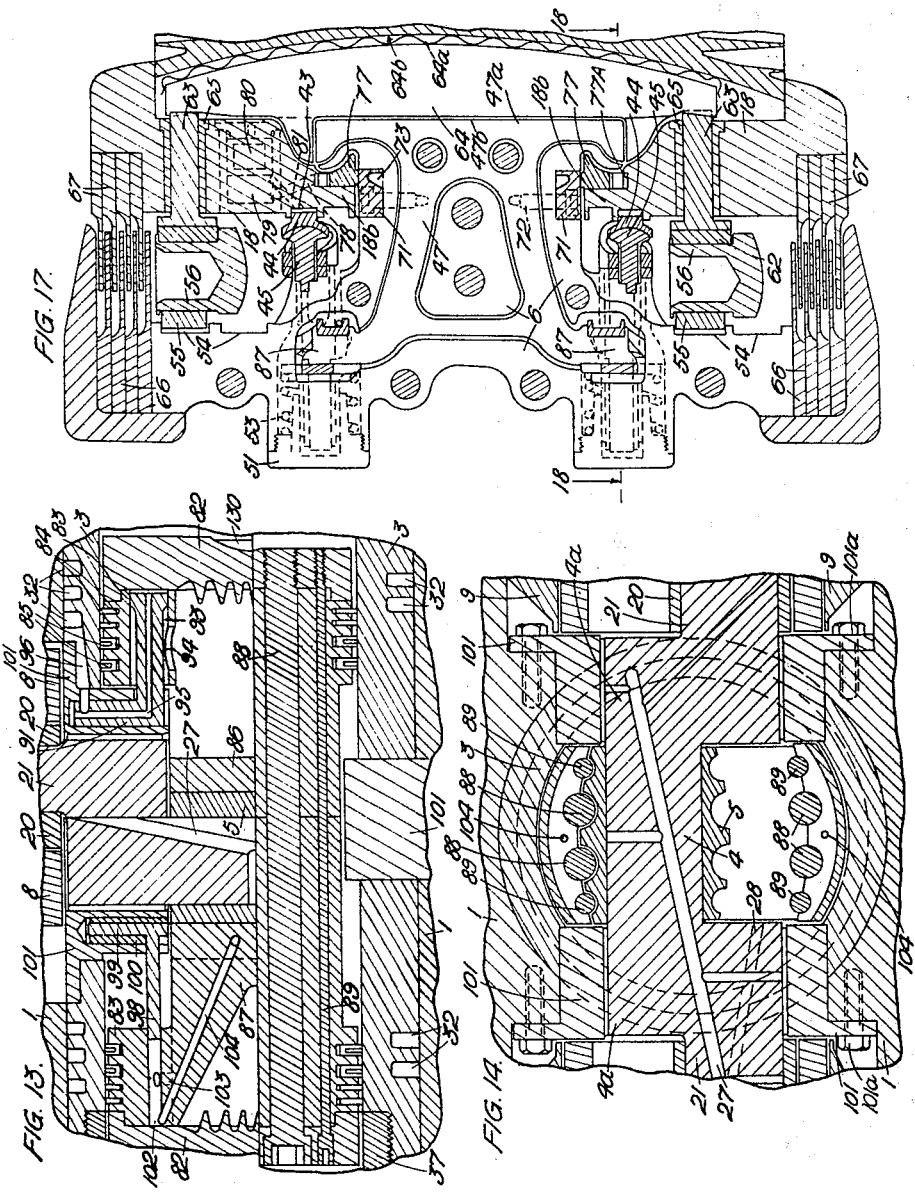

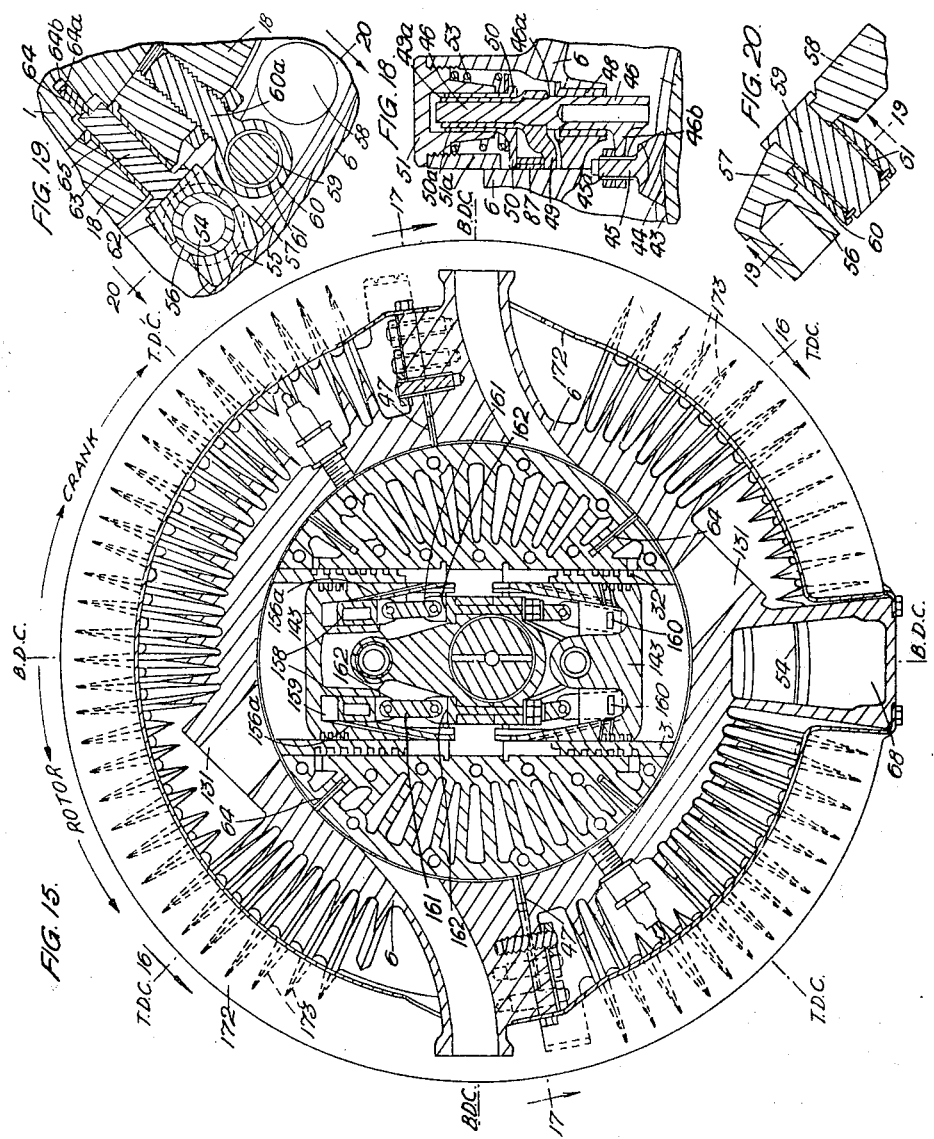

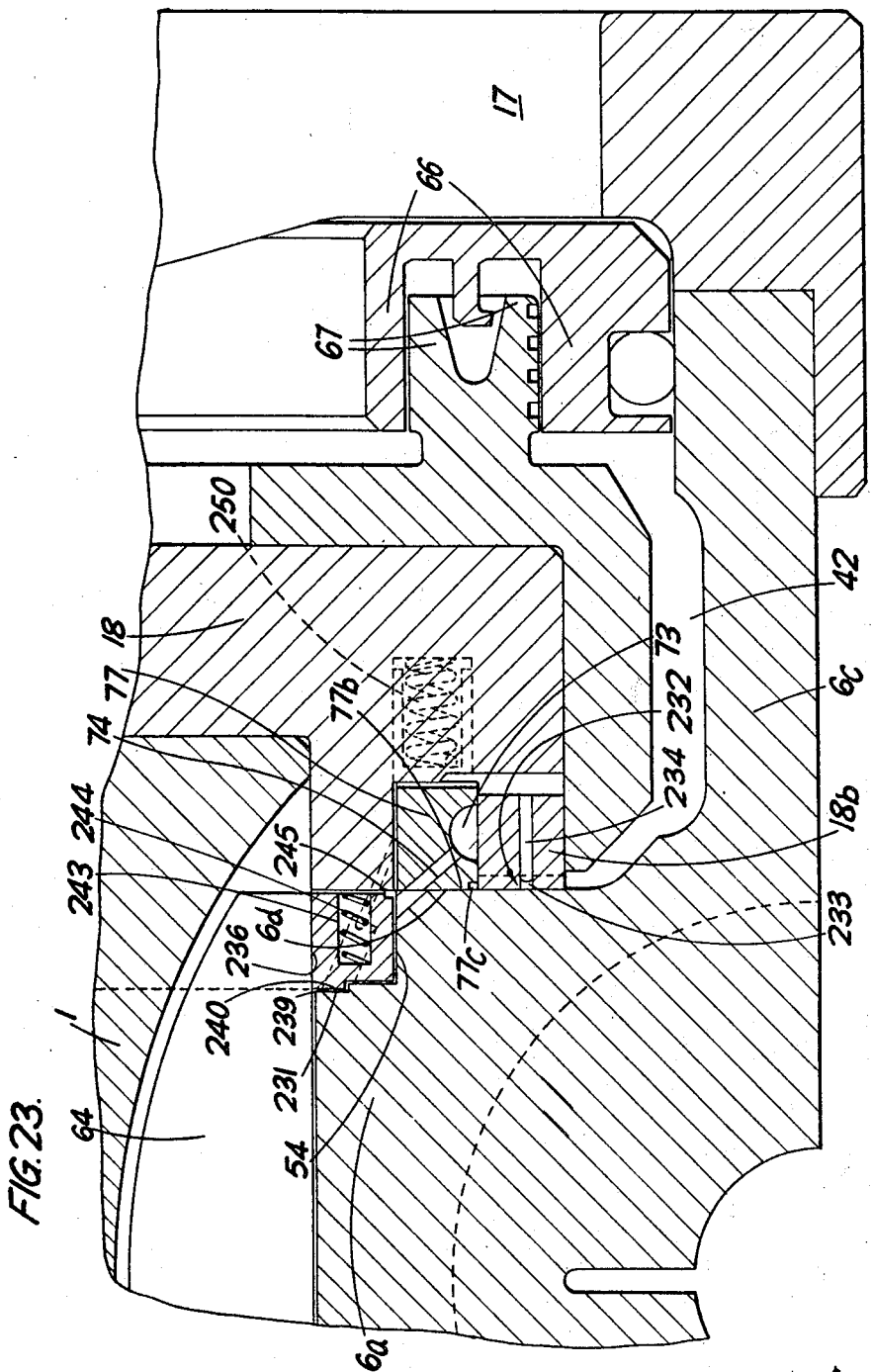

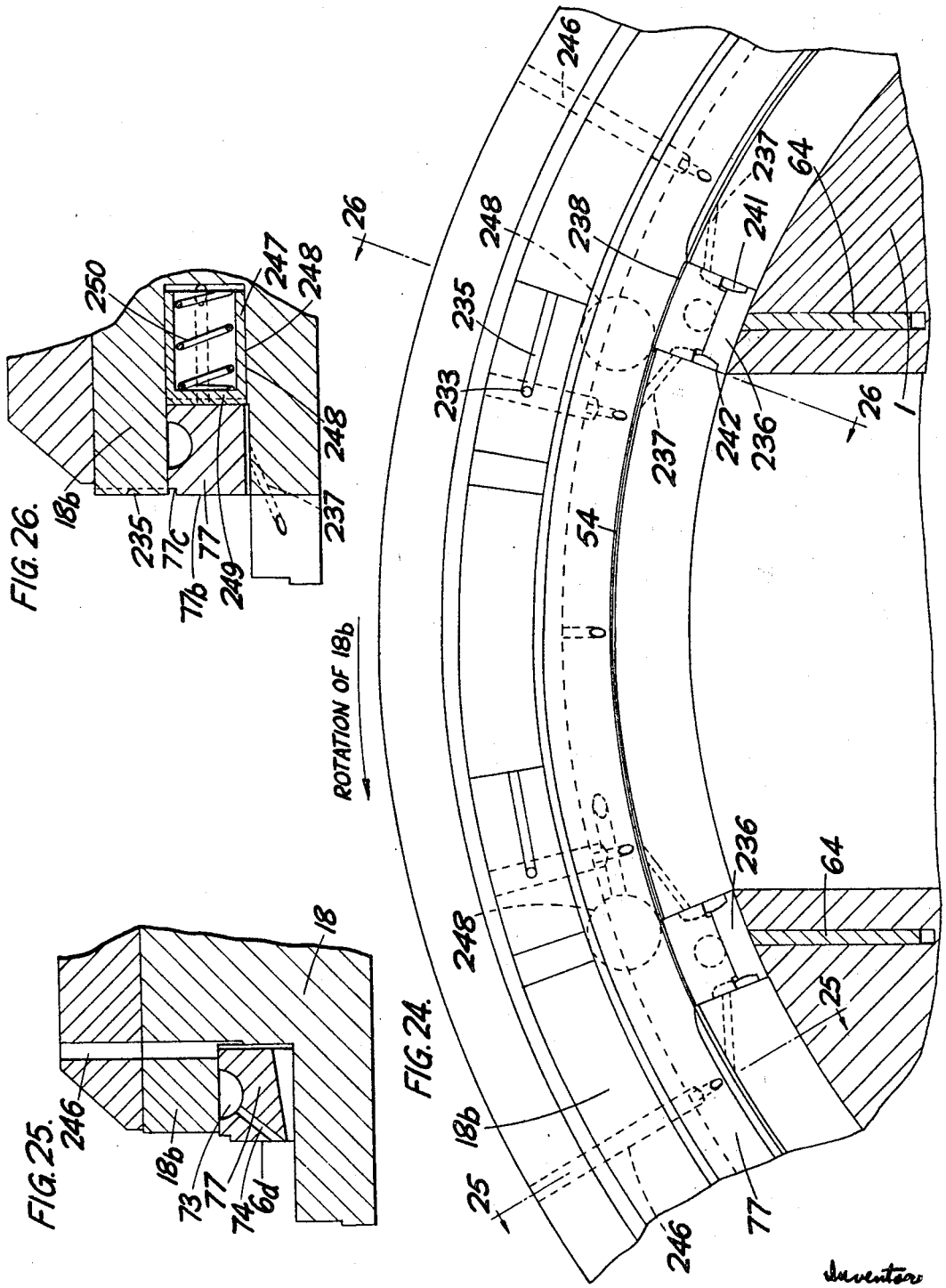

Aug. 27, 1968         P. C. VINCENT         3,398,727
ROTARY INTERNAL COMBUSTION ENGINES
Filed Feb. 1, 1967                    9 Sheets-Sheet 9
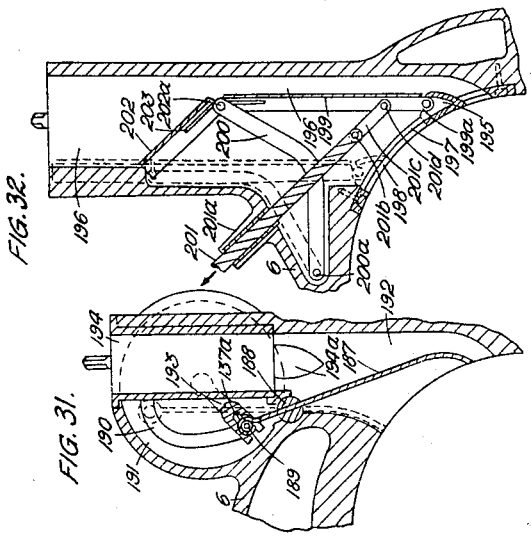
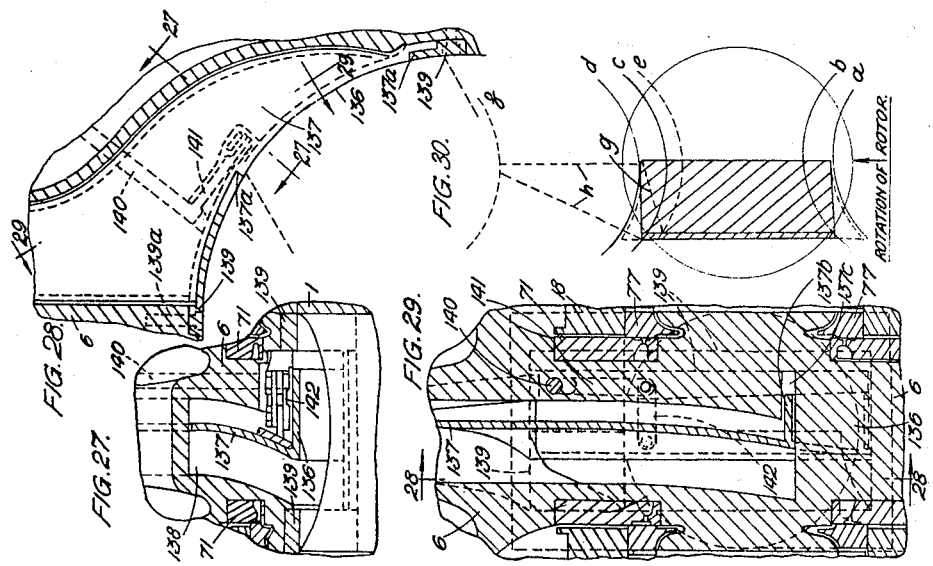

United States Patent Office 3,398,727
Patented Aug. 27, 1968

3,398,727
ROTARY INTERNAL COMBUSTION ENGINES
Philip Conrad Vincent, London, England, assignor to Vincent Rotary Engines, Limited, London, England, a British company
Filed Feb. 1, 1967, Ser. No. 613,357
28 Claims. (Cl. 123—44)

ABSTRACT OF THE DISCLOSURE

A rotary internal combustion engine comprising two reatively rotatable main components one having radially extending cylinders and the other comprising an annular structure encircling said cylinders and having inlet and outlet ports successively communicating with the cylinder ends, sealing blades mounted for radial movement on at least one of the components, and disposed between the cylinder ends, means for spacing the blade edges away from the other component sufficiently to prevent wear whilst preventing leakage between the cylinder which components have opposed circumferential sealing faces at opposite ends of the blades and means for injecting sealing fluid under pressure between said faces.

---

This invention relates to a rotary internal combustion engine of the kind in which relative rotation takes place between a ported structure containing inlet and outlet passages for the inflowing gases and outflowing products of combustion respectively and an assemblage of parts which together with the ported structure provide between them combustion spaces, the volume of which cyclically increase and decrease so that while the volume of a space increases, during part of the cycle, it communicates with an inlet passage and draws in gas while during another part of the cycle it communicates with an outlet passage whereby the products of combustion are expelled and in which sealing means are provided between the relatively rotating ported structure and said assemblage to prevent leakage of gases from the engine and leakage between said combustion spaces.

One of the objects of the invention ensures that there is minimum wear of said sealing means particularly at high surface speeds.

According to this invention a rotary internal combustion engine includes a component comprising a ported structure containing inlet and outlet passages for an inflowing charge and exhaust gases respectively, another component comprising an assemblage of parts which together with the ported structure provide between them combustion spaces which vary in volume during a working cycle of the engine, a number of sealing blades between the components of the ported structure and assemblage of parts and extending transversely to the direction of relative rotation between said components, a mounting for said blades on at least one of said components and adapted to permit movement of the blades towards and away from the other component, means for urging the blades towards said other component, means for locating said blades at a predetermined distance from said other component.

The means for locating the blades may comprise followers supporting said blades engageable with a peripheral face of said other component.

Said component of the assemblage of parts may have a peripheral face formed with ports which communicate with said combustion spaces and said ported structure may be provided with a internal peripheral face encircling and spaced away from said external peripheral face of said assemblage of parts, and said mounting for the blades comprises grooves in said external peripheral face.

In the case where the means for locating the blades comprise followers supporting said blades and engageable with a peripheral face of said other component, each of said components may be provided with transversely extending blades and the followers of which blades engage a peripheral face of said other component, and means on the periphery of at least one of said components for moving said blades associated with that component clear of the blades on the other component when said blades approach one another during said relative rotation.

Said means for urging the blades towards the other components may comprise resilient elements.

In the case where said blades are mounted on a rotatable component of said assemblage of parts and have followers engageable with a peripheral track on said ported structure, mountings for the blades may be provided on the rotatable components permitting the blades and followers under centrifugal force to move outwardly maintaining the followers in engagement with said track.

Loading means may be associated with each follower and blade which blade and mounting are so arranged that the centrifugal force on said loading means partly counterbalance the centrifugal force on the blade so as to reduce the pressure of the follower on said track.

Said loading means may comprise a rocker pivotally attached between its ends to said rotatable component of the assemblage of parts, one end of which rocker is attached to a part moving with the blade, and a mass attached to the other end of the rocker whereby the movement of said mass about the pivot axis of the rocker partly counter-balances the movements of the blade and follower about said pivot axis so as to reduce the pressure of the follower on the track.

In any of the above arrangements there may be arranged on opposite sides of said combustion chambers pairs of cooperating and axially spaced sealing faces one sealing face of each pair being formed on the component of said assemblage of parts and the other sealing face of each pair being provided on said other component.

Injecting means may be provided for injecting liquid under pressure between the sealing faces of each pair of sealing faces.

In the case where there are arranged on opposite sides of said combustion chambers pairs of cooperating sealing faces, one sealing face of each pair being formed on the component of said assemblage of parts and the other sealing face of each pair being provided on said other component, and where means are provided for injecting liquid between said oppositely spaced sealing faces, at least one of said components may be provided with recesses for receiving sealing rings on which are formed the sealing faces of that component, and means for urging the sealing rings on one of said components towards the other said component.

Resilient means may be provided between said ring and its associated component for urging the ring towards said other component.

Said resilient means between the ring and its associated component may comprise plungers slidable in bores in said component and spaced on either side of said combustion spaces, the ends of which plungers engage said ring and are close fitting within the width of said recess to provide seals around the back of the sealing ring whereby the escape of high pressure gas is prevented and there are provided springs between said plungers and the ends of their associated bores whereby the plungers are urged towards the sealing ring.

The face of the ring which is exposed to the pressure of the combustion gases may be of greater area than the face of the ring exposed to the liquid film which withstands the pressure of the combustion gases.

At least one of the sealing faces of each pair of sealing faces may be provided with recesses spaced around the said face which recesses reduce in depth in the direction of said relative rotation for causing localities of high pressure in the liquid between said sealing faces.

The sealing face which has recesses formed therein may also be provided with recesses of greater depth communicating with the trailing end of the first said recesses with respect to the direction of relative rotation between the ported structure and assemblage of parts.

The component of said assemblage of parts and the component of said ported structure may provide between them an annular collection space arranged adjacent said opposed sealing faces for collecting the liquid leaking past said sealing faces towards the aforesaid combustion spaces, and a liquid release valve is associated with said annular space for releasing excess liquid therefrom.

Each blade on a component of said assemblage of parts may have associated therewith a follower which engages a track on the ported structure which track is arranged in an annular space between a component of said assemblage of parts and a component of said ported structure which space receives lubricating liquid escaping from the sealing faces.

Said liquid release valve may comprise one or more passages communicating with said annular space leading to compartments containing floats which with accumulation of liquid in the compartments, move to open drain passages for the escape of the liquid thus controlling the level of liquid in the annular space.

In the case where there are arranged on opposite sides of said combustion chambers pairs of cooperating sealing faces, one sealing face of each pair being formed on the component of said assemblage of parts and the other sealing face of each pair being provided on said other component, means being provided for injecting liquid between said oppositely spaced sealing faces and at least one of said components being provided with recesses for receiving sealing rings on which there are formed the sealing faces of that component, the relatively rotating surfaces of said components may provide between them an annular space into which liquid may flow from the aforesaid sealing faces towards the combustion spaces and wherein scavenging means are provided for withdrawing the liquid from said space.

Said scavenging means may comprise an orifice formed in the surface of one of said relatively rotating surfaces between which surfaces liquid from said sealing faces passes to liquid collection galleries and wherein a passage extends from said orifice and communicates with said annular space.

Said orifice may be formed in the component of the assemblage of parts.

Said component which is provided with said orifice may be formed with a groove on the trailing edge of the orifice leading to the liquid collection galleries.

In the case where said means for locating said blades at a predetermined distance from said other components comprises followers supporting said blades which are engageable with tracks encircling said other component and said means for urging the blades towards the other components comprise resilient elements, said blades may be mounted on said components of said assemblage of parts so that each combustion space is disposed between two blades one on the trailing side thereof and one on the leading side thereof, and which blades extend transversely to the direction of relative rotation between said two components and wherein the faces of the followers associated with those blades which are on the trailing side of the combustion faces and which faces engage the tracks on the component of the ported structure are provided with grooves extending between the trailing and leading sides of the followers and of sufficient size as to prevent excess liquid building up on the leading side of the follower.

In the case where said means for locating said blades at a predetermined distance from said other component comprise followers supporting said blades which are engageable with peripheral tracks on said other component and said means for urging the blades towards the other component comprise resilient elements, which tracks may be arranged in annular spaces between a component of said assemblage of parts and a component of said ported srtucture which spaces receive lubricating liquid escaping from the sealing faces and said blades are mounted on said components of said assemblage of parts so that each combustion space is disposed between two blades one on the trailing side thereof and one on the leading side thereof, and which blades extend transversely to the direction of relative rotation between said two components and wherein the faces of the followers associated with those blades which are on the trailing side of the combustion faces and which faces engage the tracks on the component of the ported structure are provided with grooves extending between the trailing and leading sides of the followers and of sufficient size as to prevent liquid building up on the leading side of the follower, and said means for withdrawing liquid from said tracks comprise a passage extending radially outwards through the assemblage of parts.

The part of the component of the assemblage of parts which is disposed between two combustion spaces and between two of the aforesaid blades may be provided with passages extending radially outwards.

There may be provided means for varying the effective size of at least the end of the inlet passage in said ported structure which is adjacent said assemblage of parts, and means responsive to engine speed for actuating the first said means whereby the speed of entry of the combustible charge into each combustion space is substantially constant over the whole range of speeds of the engine for any given throttle setting.

Said means for varying the effective size of the inlet passage may comprise a masking member adjustable across the passage.

The following is a description of a number of embodiments of the invention reference being made to the accompanying drawings in which:

FIGURE 1 is a section through one form of the invention in a plane at right angles to the axis of rotation and on line 1—1 of FIGURE 2;

FIGURE 2 is a section on the line 2—2 of FIGURE 1;

FIGURE 3 is a part section through the lower part of the engine on the line 3—3 of FIGURE 1;

FIGURE 4 is a section through the cylinder assemblage on the line 4—4 of FIGURE 2;

FIGURE 5 is a view of a curved section of part of the cylinder assemblage developed on the flat;

FIGURE 6 is an enlarged view of the bottom left hand part of FIGURE 1 showing starting valve mechanism for a two-stroke cycle engine;

FIGURE 7 is a similar view to FIGURE 6 but showing mechanism for operating an exhaust valve also shown at the bottom of FIGURE 1;

FIGURE 8 is an enlarged face view of an arcuate portion of one of the rings 71 shown in FIG. 2;

FIG. 9 is a section to the arcuate portion of the ring on the line 9—9 of FIGURE 8;

FIGURE 10 is a diagrammatic view showing the different positions of the double ended piston of FIGURE 1 for different angular positions of the rotating cylinder assemblage;

FIGURES 11 to 14 are various sections through a double crown piston of similar construction to that shown in FIGURES 1 and 2;

FIGURE 11 is a section along the lines 11—11 of FIGURE 12;

FIGURE 12 is a section along the lines 12—12 of FIGURE 11 but with the cylinder assembly shown through 90° as compared to FIGURE 11;

FIGURE 13 as to the upper half thereof is a section on the cranked line 13—13 of FIGURE 11 and the lower half is a section on the line 13—13 of FIGURE 12;

FIGURE 14 is a section on the line 14—14 of FIGURE 11 but with the cylinder assemblage shown through 90° as compared with FIGURE 11;

FIGURE 15 is a section through an engine operating on a four-stroke cycle and in a plane at right angles to the axis of rotation and along the line 15—15 of FIGURE 16;

FIGURE 16 is a section on the line 16—16 of FIGURE 15 with the cylinder assemblage turned through 45°;

FIGURE 17 is a section on the line 17—17 of FIGURE 15 with the cylinder assemblage so positioned that a sealing blade on the cylinder assemblage is opposite the sealing blade on the surrounding ported structure;

FIGURE 18 is a section through a mounting for one of the sealing blades along the line 18—18 of FIGURE 17;

FIGURE 19 is a section along the line 19—19 of FIGURE 20 showing means for counter-balancing the centrifugal force on the movable parts of the mounting for the sealing blade;

FIGURE 20 is a section on the line 20—20 of FIGURE 19;

FIGURE 21 is a section through the mechanism for controlling the angular relationship between the crankshaft of the engine and the ported structure;

FIGURE 22 shows a three cylinder engine with a single throw crankshaft;

FIGURE 23 is a section through portions of the ported structure and assemblage of parts of another engine according to the invention in a plane containing the axis of rotation of the engine and showing an alternative form of sealing means between these portions;

FIGURE 24 is a part sectional view of the engine of FIGURE 23 on a plane at right angles to the axis of rotation of that engine;

FIGURE 25 is a section on the line 25—25 of FIGURE 24;

FIGURE 26 is a section on the line 26—26 of FIGURE 24;

FIGURE 27 is a cross-section through the ported structure on the line 27—27 of FIGURE 28;

FIGURE 28 is a section through the ported structure on the line 28—28 of FIGURE 29;

FIGURE 29 is a section on the line 29—29 of FIGURE 28;

FIGURE 30 is a diagram illustrating the changes in the port timing caused by a sliding masking member in the inlet port which results in an alteration in the effective shape of the port; and FIGURES 31 and 32 are similar views to FIGURE 28 showing alternative forms of masking members and their mountings.

Like reference numerals refer to like parts in the various figures of the drawings.

Referring to FIGURES 1 and 2 as previously indicated, the main part of the engine comprises a stationary crankshaft 4, 4a, a rotatable cylinder assemblage 1, 3, 18, 18a, 19, and 19a, and a stationary ported structure 6 which encircles the cylinder assemblage. An extension 4b of the crankshaft co-axial with the journal portions 4a is splined at 22 to a housing 23 secured to a hub 17a having outwardly radiating arms 17 secured by screws 17b to the stationary ported structure 6. The crankpin 4 of the crankshaft, which is eccentric with respect to the journal portions 4a, engages a bearing block 5 associated with a piston as hereinafter described. The piston extends on opposite sides of the crankpin 4 and has a crown 82 at each end thereof. The parts of the piston on opposite sides of the crankpin 4 are disposed in a cylinder liner 3, forming part of the aforesaid cylinder structure. The crankshaft is also formed with eccentric portions 21 disposed adjacent the journal portions 4a and on the opposite side of the axis thereof to the crankpin which eccentric portions 21 are encircled by bearing blocks 20 (see FIGURE 4) which rotate with and are slidable in slots 20a in balance weights 8. The weights 8 at the right hand end of the crankshaft slide in guides 9 formed in a part 10a of a power take-off shaft 10 of the cylinder assemblage, and which guides 9 extend at right angles to the sides of the block 20a in the bearing block 20. The part 10a of the power take-off shaft is secured by spokes 19 to an encircling wall 18 of the rotatable cylinder assemblage 1. Small projections 38 on the balance weight are arranged to enter recesses 39 in parts of the cylinder assemblage (as best seen in FIGURE 4) and thus force oil which may have accumulated in those recesses after lubrication of the crankshaft, along passages 40 to lubricate the faces of the blocks 20.

The power take-off shaft 10 has splined to it at 10b one part 10c of a clutch, which part 10c is supported by bearings 12 in a bearing housing 14 attached to the stationary ported structure 6 by webs 16.

The bearing block 20 at the other end of the crankshaft slides in guides 9 fixed to a boss 11 which boss in its turn is fixed by spokes 19a to the end of an encircling wall 18a of the cylinder structure. The boss is also formed with a hollow shaft 11a which is supported by a bearing 13 on a part of the stationary housing 23. The boss 11 and hollow shaft 11a are located axially with respect to the crankshaft by thrust washers 29, 30 the former being disposed between an end face of the boss 11 and a shoulder on the crankshaft and the latter between a flange on the housing 23 and the end of the hollow shaft 11a.

A rotary oil pump 24 is located in a gallery 68 hereinafter referred to and which pump is driven from a hollow shaft through a worm gearing a part of which is indicated at 26. A worm wheel (not shown) engages this part and drives a shaft 25 which in its turn drives the pump through gearing (not shown). The pump supplies lubricating oil to the bearing 13 and thence through various passages 27, 28 to the various bearings and bearing blocks referred to above, through ports adjacent to those bearings.

The rotatable cylinder assemblage is formed in a number of parts comprising an annular cylinder block 1, the end faces of which are formed with arcuate cooling fins 31 struck about the axis of rotation of the cylinder assemblage. The inner peripheral face of the annular block 1 encircles shoulders at the inner extremities of the spokes 19 and 19a. The spokes 19 and 19a may be in the form of blades so as to direct a stream of air onto the fins 31. The inner circumferential face of the annular cylinder block also encircles the outer flanges on sleeves 101 encircling the journal portions 4a of the crankshaft.

The outer peripheral face of the annular cylinder block 1 is encircled by inner cylindrical faces of the encircling walls 18 and 18a. The annular cylinder block 1 is diametrically bored to receive a cylinder liner 3 which is transversely bored midway along its length to receive the afore said sleeves 101 which are held in position by screws 101a (see FIGURE 14) which pass through holes in the flanges of the sleeves and engage threaded holes in the cylinder block.

The part of each cylinder liner which is exposed to the burning charge is recessed and threaded to receive an externally threaded sleeve 37 formed from low heat conductivity material. The outer surface of each cylinder liner is formed with a helical groove 32 which constitutes with the encircling cylinder block 1, a passage through which cooling oil may be circulated by pumps associated with the pistons as hereinafter described.

As will be seen from FIGURE 2 the encircling walls 18 and 18a of the cylinder assemblage are provided with axially extending lips 18b directed towards one another and forming between them a circumferential slot in the cylinder assemblage. The aforesaid ported structure 6 is formed with an annulus 6a parts of which underlie and are spaced from the lips 18b to form circumferential grooves to accommodate split rings 77 hereinafter referred to. The annulus 6a is also formed with a waisted portion 6b disposed within the aforesaid circumferential slot of the cylinder assemblage. The inner circumferential face of the annulus 6a lies closely adjacent to the peripheral face of the annular cylinder block 1 which face is intersected by the two engine cylinder bores. The annulus 6a is provided with two side by side inlet passages 132, 133 (FIGURE 2) through the former of which combustible mixture flows at low speeds and through the latter of which additional mixtures flow at high speeds as set out later. The annulus is also provided with an exhaust passage 131 (FIGURE 1) disposed circumferentially away from the passages 132, 133. The open ends of the cylinders sweep successively past the inlet and exhaust passages which are so disposed in relation to the throw of the crank as to provide the required timing for the opening and closing of the ports.

As indicated earlier an object of the invention is to provide sealing means, which are not subject to excessive wear and will prevent leakage of gases between opposed circumferential faces of the cylinder block 1 and annulus 6 and thence to atmosphere via the inlet and exhaust ports and other sealing means to prevent leakage from each individual cylinder bore past the annulus 6 between its waisted portion 6b and the lips 18b to atmosphere. The first of these leakages is prevented by a number of blades 64 (FIGURE 1) disposed in substantially radial grooves in the cylinder block 1, and extending axially across the outer peripheral face of the cylinder block and which blades are disposed opposite the inner peripheral face of the annulus 6a. FIGURE 1 shows four such blades between adjacent combustion spaces. There is described later with respect to FIGURE 17 how these blades are urged outwardly and how their edges are spaced a predetermined distance away from the circumferential face of the annulus 6a in order to avoid wear but so as still to act as sealing means. There are also provided blades 47 mounted in radial slots in the stationary ported structure 6 and which blades are urged towards the outer circumferential face of the rotating cylinder assemblage but which blades are prevented from contacting therewith in the manner hereinafter described.

As will be explained later, the means for preventing engagement of the blades with the faces they seal include tracks 43 and 54 (FIGURE 2) on the walls 18, 18a, and on a part of the ported structure 6.

The means for preventing leakage of combustion gases or liquid between the annulus 6a and each of the lips 18l of the ported structure, are now described.

Secured by screws 72 in a rebate on each side of the waisted portion 6b of the ported structure, is a ring 71 (see FIGURES 2, 8 and 9). The inner face of the ring abutting the waisted portion 6b is formed with a groove 73 which receives liquid from the pump 24 driven by the engine. The pressure and flow of liquid is increased by centrifugal action and thus increases with engine speed. Holes 74 (FIGURE 9) in the bottom of the groove feed the liquid to a number of shallow arcuate grooves 75 on the opposite side of the ring (see FIGURES 8 and 9) which grooves are separated from one another by ribs 75a the holes being disposed adjacent the ribs. The bottom of each shallow groove 75 as it extends from a hole 74 tapers towards the mouth of the groove in a step 76a.

As indicated above a region of pressurised liquid is formed between the opposed faces of the rings 71 and 77 and as shown in FIGURE 23 the face 77b of each ring 77 is cut-back at the edge remote form the engine cylinders as indicated at 77c in FIGURE 23 thereby reducing the area of that face of each ring 77 which is in contact with the pressurised film. Since the larger area on the opposite side of the ring is subjected to the gas pressure in the engine cylinders the pressure of fluid between the rings 71 and 77 will be at all times sufficient to prevent leakage of the gases from the engine cylinders in spite of the fact that they are fluctuating in pressure.

As previously indicated parts of the annulus 6 underlying and spaced from the lips 18b on the encircling wall 18 of the cylinder assemblage form circumferential grooves in which the split rings 77 are located. A side face of each split ring 77 overlaps the shallow grooves 75 in the ring 71 which communicate with the circumferential groove 73 through said holes 74. It will be appreciated that any liquid collecting adjacent the rings 77 will be forced by the pressure developed in the cylinder and by centrifugal force to the passage 78 (FIGURE 3) and thence to the passage 81 leading to the collecting galleries 42. The rings 77 are also pressed towards the rings 71 by springs 77a disposed between the rings 77 and the walls 18 and 18a. The relative rotation between the rings 71, 77 and the effect of liquid flowing along the taper 76 causes fluid pressure to build up between the rings thus preventing the leakage of gas from the cylinders between them and preventing solid contact between the sealing faces.

Any liquid escaping collects in the gallery passages 42 between the walls 18, 18a and an encircling wall 6c of the ported structure. These gallery passages are bounded on one side by a water jacket 41 and on the other side by a labyrinth seal, certain elements 66 of which are attached to the walls 6c and others 67 to the walls 18, 18a which labyrinth seal thus prevents the escape of liquid and any seeking to escape will be centrifuged by the elements 67 and drain back through holes 69 (see FIGURE 3) into the aforesaid collecting gallery 68 associated with the pump 24. Any liquid that flows from the inside of the split ring 77 is drained through a passage 78 to a cylindrical pocket 79 causing a float 80 therein to uncover an outlet passage 81 and for the liquid to be led via the track surfaces 43 and into the gallery 68.

Under certain running conditions reductions below ambient to pressures in the combustion spaces may occur. In order to enable the sealing liquid which flows from the sealing faces into the aforesaid annular spaces and the combustion spaces to be discharged when such reductions occur means are arranged to withdraw liquid from the annular spaces at all times as hereinafter described.

In FIGURE 23 portions on the ported structure and assemblage of parts of another engine according to the invention are shown in which an internative sealing arrangement between the ported structure and assemblage of parts is provided and there is also provided said means for withdrawing liquid from the annular spaces. This engine also differs from that described above in that only the assemblage of parts is provided with sealing blades for preventing the escape of gases from cylinder to cylinder between the outer circumferential surface of the assemblage of parts and the internal circumferential surface of the ported structure.

The sealing ring 77 which underlies the lips 18b has a sealing face 77b which slides over a sealing face 6d formed on the ported structure. Liquid flow is conducted through passages 73 and 74 in the sealing ring to the sealing faces 77b as hereinbefore described. Certain of the liquid may escape from the sealing faces towards the annular spaces indicated at 231 and such liquid is drawn by the pumping means indicated at 232 and aided by centrifugal force to the collection galleries 42. The pumping means comprise an orifice 233 formed in a surface of the lips 18b spaced opposite a surface on a part of the ported structure 6, and between which surfaces there is a liquid film. The orifice communicates with a passage 234 drilled through the lip 18b. The other end of the passage communicates with annular gaps formed between the back of the sealing ring 77 and the faces of the sealing ring recess formed in the assemblage of parts.

Relative rotation between the assemblage of parts and ported structure causes the orifice to be drawn over the liquid film which is between the lips 18b and ported structure 6. A drop in pressure of the liquid in the orifice caused by the said rotation is communicated through the passage 234 to the annular space 231 via the gap between the assemblage of parts and sealing ring thereby drawing the liquid from that region.

The above effect may be enhanced by the provision of a groove 235 (see FIGURE 26) on the trailing side of said orifice in the surface of the assemblage of parts extending in respect of the direction of said relative rotation. The bottom of the groove may be inclined or have a part which is inclined so that, at the orifice, the depth of the groove is greatest and the groove, extends to a side wall of the assemblage of parts so that liquid is discharged into the gallery 42.

As can best be seen in FIGURE 26 instead of the provision of a leaf spring between the sealing ring and assemblage of parts for urging the ring towards the ported structure there may be provided plungers one of which is shown at 247 which is slidable in a bore 248 in the assemblage of parts 6 and has a head 249 which engages on the back face of the sealing ring 77. A coil spring 250 is disposed between an end wall of the bore and the plunger and is arranged to urge the plunger into engagement with the sealing ring which in turn is urged toward the ported structure. The plunger 247 is a close fit in the sealing ring recess formed in the assemblage of parts 6 and thus prevents combustion gases or sealing liquid from flowing circumferentially around the back of the sealing ring groove under the fluctuating gas pressure cycle. One of these plungers is located substantially in line at each end of each transverse sealing blade 64 as shown in FIGURE 24.

Returning now to the engine described with reference to FIGURE 3 liquid finding its way into the galleries 42 also flows into the gallery 68 being deflected by a baffle 205 through an opening 206. A similar opening 207 on the other side of the baffle drains the liquid which runs down the wall of the galleries 42 against rotation of the walls 18, 18a.

The engine so far described is arranged to operate on the two-stroke cycle principle in which the inertia of the exhaust gases leaving the cylinders assists in drawing in of the combustible gases into the cylinders as their open ends pass the ports 133, 132. Upon starting the engine, however, the above action requires to be supplemented and this is effected by a special valve mechanism which is illustrated in FIGURES 1, 6 and 7.

It will be seen from FIGURE 6 that the ported structure 6 is formed with a radially extending stepped cylinder 105a, 111 within which reciprocate respectively pistons 105 and 107 which are joined by a piston rod 106. The cylinder portion 105a opens into the space between the annular cylinder block 1 and the ported structure 6.

The end of the cylinder portion 111 is closed by a plug 115 and the piston rod 106 extends through a gland 109, separating the cylinder portions 105a and 111. A compression spring 108 is disposed between the gland 109 and washer 106a which rests on the shoulder 106b on the piston rod 106. The compression spring 108 is sufficiently strong to prevent movement of the piston rod 106 when its associated piston 105 is subjected to the pressure of compressed but unignited mixture within a cylinder of the engine sweeping past it but when combustion takes place in the engine cylinder the spring will permit movement of the piston and parts 105, 107 under combustion pressure or partial combustion pressure thus allowing the pistons 105, 107 to move away from the axis of rotation of the engine. This movement causes the piston 107 to force oil under pressure to flow through the passage 116 to control mechanism which close exhaust and inlet valves 121, 126 as described later. After the piston 105 is no longer subjected to combustion pressure, the spring 108 will return the loosely fitting pistons 105, 107 towards the crank shaft, forcing liquid through the passage 116a to keep the valves 121 and 126 closed. When the engine is running normally the pistons 105, 107 will only oscillate at small amplitudes thus keeping the valves permanently closed. When the engine stops, liquid leaks past pistons 119, 124 associated with valves 121, 126 returning the liquid to the gallery 68 via oilways 127, 128 enabling the valves 121, 126 to open under the action of springs 120, 125. Oil under a moderate pressure may be supplied through a hole 113 and nonreturn valves 114 to axially spaced passages opening into the cylinder 111 on either side of the piston 107.

The ported structure is also provided on the trailing side of the cylinders 105a, 111 with a passage 121a leading to exhaust and controlled by the exhaust valve 121.

The stem of the valve 121 projects outwardly through the valve guide and has secured to it the piston 119 reciprocable in a cylinder 118. A compression spring 120 is disposed between a plug at the end of the cylinder and the piston 119.

Spaced passages 116, 116a connect the cylinders 111, 118. The passage 116 contains a non-return valve 117 (FIGURE 1). The ported structure 6 is provided, in retard of the exhaust passage 121a with an inlet passage 126a controlled by an inlet valve 126. The stem of the valve extends beyond the valve guide and has secured to it a piston 124 in a cylinder 123. A spring 125 is disposed between a plug at the end of the cylinder and the piston 124. A passage 122 connects the inner ends of the cylinders 123, 118 together. Passages 127, 128 connect the outer ends of the cylinder 118 and 123 with the gallery pipe 68.

When starting the engine from rest the supplementary exhaust and inlet valves 121 and 126 will be in their open positions under the action of their springs 120, 125 and the pressure responsive piston 105 and associated piston 107 will have been brought to one limit of their travel in their cylinders 111, 105a under the action of the spring 108. When the engine is started up a port at the end of an engine cylinder sweeps past the inlet passage 132, 133 and since the engine has not yet fired and there has been no discharge of exhaust gas the pressure within the engine cylinder will only have been slightly reduced and hence very little charge is drawn in and when a point in the cycle is reached where a charge would normally be fired only partial combustion or even no combustion occurs and the pressure within the engine cylinder will be substantially below normal compression pressure as the engine cylinder traverses the open end of the cylinder 105a containing the piston 105 and the prevailing pressure will not compress the spring 108. Thus the supplementary inlet and exhaust valves remain in their open positions. The piston in the engine cylinder is now near top dead centre and as the engine cylinder sweeps past the open supplementary exhaust valve the greater part of the gases in a compressed state are expelled through the passage 121a communicating with the supplementary exhaust valve 121. Immediately afterwards the engine cylinder sweeps past the supplementary inlet valve 126 and since by this time the piston in the engine cylinder is moving away from top dead centre position a substantial charge is drawn through the inlet passage 126a into the engine cylinder. The engine cylinder then passes the main inlet and exhaust passages 132, 133, 131. The engine cylinder has not received a substantially normal charge and when at top dead centre or thereabouts is reached normal combustion takes place accompanied by a rapid increase in pressure in the engine cylinder. Shortly afterwards the engine cylinder sweeps past the pressure responsive cylinder 105a and this increased pressure causes the pressure responsive piston 105 to move against the action of the spring 108. The movement of the piston 105 causes the associated piston 107 to generate a pressure pulse down the oilway 116 causing the valves 121 and 126 to be closed. When the pressure responsive piston 105 is no longer subjected to high pressure, it and its associated piston 107 are moved towards their inward limit of travel under the action of the spring 108 and in so doing the piston 107 causes a second pressure pulse to be generated along the passage 116a which retains the supplementary inlet and exhaust valves in their closed position where they remain as long as the engine is firing normally.

Referring now to FIGURES 11 to 14 for the constructions of double crowned pistons, it will be seen that each crown 82 is spigoted into a skirt portion 83 which is provided with compression rings 84 and scraper rings 85. Each skirt portion has an integral cross member 86 reinforced by a web 87, which cross members form the guides for a bearing block 5 which encircles the crankpin 4. Large and small diameter bolts 88, 89 extend through holes in the crowns and through the skirt portions and secure these parts together. Each piston skirt 83 is formed with four cylinder bores 93 (as best seen in FIGURE 12) in which are reciprocable four pistons 92 having piston rods 90. The inner ends of the piston rods have spindles 91 extending at right angles thereto and which may pivot and slide axially in holes in the sleeve 101 which is fastened to the cylinder assemblage and loosely encircles the journal portions 4a of the crankshaft. The pistons, piston rods and spindles have passages 95 extending through them communicating with a recess 96 leading to the helical grooves 32 in the cylinder liner 3 (see the upper right hand end of FIGURE 13). Liquid which is centrifuged into the piston skirt 83 may be spun through ports 94 to the cylindrical bores 93 and then pumped through the passage 95 to the recess 96. Likewise each skirt 83 is formed with two cylindrical bores 102 of smaller diameter in which are reciprocable plungers 98 having spindles 99 extending at right angles from their inner ends and which pivot and axially slide in bushes 100 in the aforesaid sleeve 101. Ports 103 in these cylinder bores 102 receive oil from the piston cooling supply when the skirt 83 moves outwards and on the return stroke this oil is forced at high pressure along oilways 104 (FIGURE 13) to the opposed faces of the aforesaid bearing block 5 which circles the crankpin and engages the cross member 86.

As indicated above the crankshaft is stationary, i.e., fixed against rotation and the cylinder assemblage 1 rotates about the journal portions 4a of the crankshaft whereas the eccentric crankpin 4 engages the bearing block 5 which slides in the guide between the cross members 86 in the piston transversely to the axis thereof. The position of the double crown piston during various parts of the revolution of the cylinder assemblage is indicated in FIGURE 10.

The general arrangement of the engine shown in FIGURES 15, 16 and 17 is similar to that described above and like parts are given like reference numerals. The engine operates upon a four stroke cycle and is provided with a two throw crankshaft 153 which drives two separate pistons 143. A central throw 145 of the crankshaft is encircled by a bearing 150 in the big end of a connecting rod 146. The small end of the connecting rod has a bearing 148 which encircles a gudgeon pin 157. The gudgeon pin engages bosses in one of the pistons in conventional manner. The other throw of the crankshaft is constituted by two separate parts 144 on either side of the throw 145, each part being encircled by a bearing 151 in the big end of a connecting rod 147 and the small ends of the two connecting rods have bearings 149 both of which encircle the other gudgeon pin 157.

As will be seen from FIGURE 15 each piston is formed with two cylindrical bores 159 in which reciprocate pistons 158. The pistons receive their reciprocating movements from the swinging movement of the connecting rods relatively to the pistons for which purpose the pistons 158 are connected by links 161 pivoted to them and to the ends of bolts 162 which secure the two parts of the big end of the connecting rod together. The cylinders receive liquid centrifuged into the piston which is then forced through ports 160 into the cylinders 159 and is pumped through passages 156a to the piston and cylinder liner surfaces. The various bearing surfaces of the big ends and crankshaft receive oil under pressure through passages 169, 156 from an oil pump suitably driven from the engine.

The engine differs from the engine first described above in that the crankshaft 153 rotates in the opposite direction to the cylinder block for which purpose the left-hand end of the crankshaft, which is mounted in a bearing 154 in the cylinder block, has secured to it a sun wheel 163 of a planetary gear, which sun wheel engages planetary gears 164 having bushes 165 which rotate on pins 166 secured to a planetary gear carrier 167 which is normally fixed but can be given a slight angular movement by means described later. The planetary gears 164 engage an internal toothed ring formed on the hub portion 11 of the tubular shaft 11a which is secured to the rotatable cylinder block 1. The sun wheels and planet wheels have the same number of teeth. The planet wheel carrier 167 is provided with a shaft 167a which is splined at 22 in the housing 23 which shaft 167a is provided with an oil passage 169 leading to the oil passage 156 in the crankshaft, a seal 168 being provided between these two parts. A sleeve 177 is splined to a final drive shaft 178 and at the left-hand end is provided with internal dog teeth 176 which may be brought into engagement either with dogs 174 on a hollow shaft 155 fixed to the cylinder assemblage 1 or into engagement with dog teeth 175 on the end of the crankshaft 153. This movement may be imparted to the sleeve 177 by a fork 180 which engages a circumferential groove on a member 179 fixed to said sleeve. A final drive shaft 178 is mounted in bearings 183 in the housing 14 which is carried by arms 185 secured to the ported structure 6.

The engine is encircled by a cowling 172 air being drawn into the cowling by the aforesaid blades 19 and being circulated through fins 173 cast integrally with the ported structure 6.

In order to vary the timing of the opening and closing of the inlet and exhaust ports by means of relative rotation between the cylinder assemblage and ported structure means are provided for imparting a limited degree of rotational adjustment to the planet carrier 167, this is effected by the mechanism shown in FIGURE 21.

The spindle 167a of the planet carrier is formed with external helical splines 213 which engage similar splines on a hollow shaft 208a of a piston 208 and the outer surface of the hollow shaft 208a is provided with straight splines 211 which engage similar splines on the internal surface of a fixed cylindrical member 212a. The cylindrical member 212a joins a larger cylinder 212 in which the piston 208 is located. A compression spring 210 is disposed between the piston 208 and the shoulder between the two cylinder portions 212 and 212a. A sleeve valve 214 is axially movable in the tubular hollow shaft 208a and is provided with a port 221 which communicates with the oil passage 169. Oil is fed to the passage 169 through a bleed hole 220 and is also fed to the left-hand end of the cylinder 212 from a suitable source. The sleeve valve may be moved by a fork 216 which engages a circumferential groove thereof and which is moved by the lever arm 218 which may be connected at 217 to a governor driven in accordance with the speed of the engine, thus when the speed increases the sleeve valve is moved to the right whereby the port 221 is obscured by the hollow shaft 208a the pressure to the left of the piston will increase moving it to the right thus causing the planet carrier to be rotated which in its turn causes an additional relative rotation between the crankshaft and the cylinder block in a sense which will result in the inlet port becoming open earlier in the cycle, the movement of the piston 208 will again uncover the port 221 and the parts will remain in the adjusted position. As indicated in the description of the engine shown in FIGURES 1 and 2 the escape of gases from cylinder to cylinder between the outer circumferential surface of the cylinder block and the internal circumferential surface of the annulus 6a is prevented by blades 47 mounted in radial slots in the annulus 6a and other blades 64 mounted in radial slots in the cylinder block 1. The manner in which these blades are mounted is shown in FIGURES 17 to 20. It will be seen that the inner edge of each blade 64 is curved and is disposed opposite a curved bottom wall of the radial slot 64b in the cylinder block 1, a wavy spring 64a being disposed between them so as to urge the blade radially outwards towards the walls 18 and 18a of the cylinder assemblage, and towards the annulus 6a of the ported structure. Each end of the blade 64 engages a tappet 63 reciprocal in a bearing 65 in one of the walls 18, 18a of the ported structure. The outer end of the tappet has secured to it a bearing block 62 having a part cylindrical surface which engages a hollow journal 56 secured to one end of a rocker 57, the hollow journal 56, on the opposite side thereof to the bearing block 62, is engaged by the part cylindrical surface of a shoe 55, the outer end of which engages one of the aforesaid tracks 54 on the outer wall of the ported structure 6. A fulcrum pin 59 at the center of the rocker rotates in a bush 61 in an eye 60 at the end of a threaded stem 60a which engages a threaded hole in the wall 18. The opposite end of the rocker arm is formed with a balance weight 58 so chosen that the rocker relieves the shoe 55 of the desired portion of load during the rotation of the cylinder assemblage.

With this arrangement the engagement of the shoe with the track 54 maintains the blades at a predetermined distance from the inner surface of the annulus 6a.

As best seen in FIGURE 17 each of the blades 47 is so shaped that a part 47a thereof is disposed beneath the lips 18b on the walls 18 and 18a of the ported structure so that edge 47b of the blade is disposed across a part of the outer circumferential surface of the cylinder block 1. The outer end of each blade is provided with ears 87 which are located between clamping members 49, 50 (FIGURE 18). The clamping member 49 is formed on a sleeve 49a which encircles a tappet 46 and the clamping member 49 rests on a shoulder 46a on the tappet. The other clamping member 50 has a sleeve portion 50a which encircles the sleeve 49a and can reciprocate in a hollow plug 51 which is in screw threaded engagement with a socket 51a which is secured to a part of the ported structure 6. A spring 53 is disposed between a shoulder on the plug 51 and the clamping member 50.

The lower end of the tappet is provided with an arm 46b having a threaded hole through which a threaded stem 45a of a tappet adjuster 45 engages. The tappet adjuster has secured to it a spherical surface which engages a spherical depression in a shoe 44 which rests on the track 43. The lower end of the tappet 46 is disposed in a bearing 48 fixed to the ported structure 6. By these means the inner edge of the blade 47 is held a predetermined distance away from the outer circumferential face of the cylinder block 1. In order to prevent the blades 47 and 64 coming into contact during the relative rotation between the cylinder blocks and the ported structure the tracks 43 and 54 may be provided with suitable contours.

As described above sealing blades are provided on the assemblage of parts and these blades are arranged to be limited in their movements towards the ported structure by follower devices which engage tracks on the ported structure.

A further arrangement of this embodiment is shown in FIGURES 23 and 24 in which blades 64 having follower devices 236, are shown, and which follower devices engage the tracks 54, which tracks are situated in the aforesaid annular spaces 231 and are lubricated by liquid which escapes from between the aforesaid sealing faces towards the combustion spaces.

The follower devices consist of a block of metal the upper face 238 of which is machined convex, to have substantially the same curvature as the internal track 54 on the ported structure (see FIGURE 24). As can be seen in FIGURE 23 one side of the follower device is provided with a step 239 so that the width of the part of the follower which is engaged by the blade 64 is greater than the width of that part which engages the track 54 on the ported structure. The assemblage of parts and ported structure are provided between them slots to accommodate the followers each of which in cross-section is similar to the cross-section of a follower device and has a stepped side 240. Inclined grooves 241, 242 are formed in the leading and trailing faces of each follower device leading from one side of the following and coinciding with the said step 239 on that side towards the other side of the follower at a point nearer to the face of the follower which engages the track 54. The inclined slots serve to permit the centrifuging of liquid from the region of the stepped portion on the follower to the other side of the follower whereafter the liquid centrifuges onto the track 54 overwhich the follower device moves or into the adjacent annular space through passages 237.

Each follower device is provided with a bore 243 (see FIGURE 23) in which there is a coil spring 244. The spring 244 is compressed between the end of the bore 243 in the follower and a side wall of the slot in which the follower resides whereby the follower is urged towards the oppositely spaced stepped side of the slot.

Those followers which engage blades which immediately trail a combustion space have grooves shown at 245 in FIGURE 23 which permit an increased flow of lubricating liquid from the leading to the trailing side of the follower during its movement over the lubricated track. At spaced positions not subjected to combustion pressure around the assemblage of parts, passages 246 are bored outwardly with respect to the axis of rotation from annular spaces connected with the aforesaid track over which follower devices (see FIGURE 25) move, which passages communicate at their outer ends with the oil collection galleries 42. The passages serve to prevent excess liquid from accumulating on the tracks 54 around the ported structure.

FIGURE 22 shows a three cylinder rotor 223 with a single throw crankshaft 224 with balance weight 225, a master connecting rod 226, U shaped link rods 227 and two pins 228 in bushes 229 that join rod 227 to rod 226. Three pistons 230 are shown.

Referring to FIGURES 27 to 30 a masking member 136 is adjustable across an inlet port and passages 138 in the ported structure 6 in a direction transverse to the direction of rotation of the cylinder assemblage 1. In order that the timing of the opening and of the closing the inlet ports, due to the relative rotation between the cylinder assemblage and ported structure, may be varied the mouth of the inlet passage in the ported structure is appropriately shaped for example it may be of rectangular contour and is disposed to one side of the locus of movement of the centres of the open ends of the engine cylinders. Assuming the masking member has a straight edge and is moved across the ports transversely to the direction of movement of the cylinder assemblage the effect can be seen from FIGURE 30. The cross hatched area shows the mouth of the rectangular inlet port in the ported structure 6; the line just inside the rectangle and parallel to the left-hand side shows the limit of advance of the straight edge of the masking member 136. On the right hand side of the port, the narrow space enclosed between this line and the left-hand side of the port is the minimum port opening at low engine speeds. When the port is fully open at high speeds the straight edge of the masking member is at the right-hand side of the port. The full circle shows the position of the open end of the cylinder when the masking member provides for a full port opening.

As will be seen from FIGURE 30 the arc *a* represents the open end of the cylinder is about to overlap the inlet port in the ported structure. If, however, the straight edge of the masking member had been to the left of the latter port the arc *a* would have only started to overlap and open the port during a later part of the stroke of the piston, in other words when the masking member provides for a full port opening at full throttle and maximum speed the open end of the engine cylinder commences to overlap earlier than if the masking member was in a position to restrict the port.

Similarly it will be seen from the upper part of FIGURE 30 the open end of the engine cylinder will have moved past the port in the ported structure later in the cycle when the masking member provides maximum port opening than if it were in a position to provide minimum port opening. If it is desired that timing is not to be affected by the position of the masking member then the shape of the port is modified as shown by the curved dotted lines. If, on the other hand, it is required to delay the closing of the port by reason of the relative movement between the cylinder assemblage and ported structure, then the opening of the port into the cylinder would be shaped somewhat as shown by dotted lines *h*, the final cylinder position at closing being indicated by the curved dotted line *f*. On the other hand if it is required that a port in the ported structure should be closed earlier at lower engine speeds by reason of the relative rotation between the cylinder assemblage and ported structure the end wall of the port would require to be disposed somewhat as shown by the dotted line *g*.

The movement of the masking member may be controlled by a governor driven in accordance with the speed of the engine.

A group of inlet ports may be arranged in the ported structure at least one of which is controlled by a masking member so that the velocity of gases through each inlet port entering a cylinder may be maintained substantially constant with varying engine speeds. Two inlet ports of different size may be arranged side by side in the ported structure in the direction of the axis of rotation of the engine as shown in FIGURES 1 and 2 and comprise two separate ports the low speed port 132 which is unthrottled and the high speed port 133 which is throttled by any convenient means which may be mounted in an extension secured to a flange by studs not shown in these drawings. At least the larger of the two ports 133 is provided with governor means for cutting off the supply of gas whereby the velocity of gas entering the cylinder may be maintained substantially constant at both low and high speeds.

Where a group of valve controlled inlet ports are provided in the ported structure through which gases flow into an engine cylinder, a measure of timing control may be obtained by the length and precise circumferential location of these ports around the ported structures (i.e., by arranging the centres of areas of the ports to be spaced apart in the direction of rotation of the engine) and by the control of said valves. For example if the port that is opened to provide peak power gives longer timing than the other port or ports the duration of the port opening will become longer when that port is unthrottled. The throttles of the individual ports may be governor controlled so that the ports for higher speeds may be opened when predetermined speeds are reached. With this arrangement not only may the velocity of the gases entering a cylinder be automatically maintained substantially constant with changes of engine speed but also the time when gases commence to enter an engine cylinder relatively to the position of the piston therein is suited to the engine speed.

As best been in FIGURE 27 the masking member 136 is provided with an extension piece 137 which projects into the inlet passage 138 and in the ported structure 6.

As will be seen extension 137 of the masking member 136 is of considerable length as compared with the width of the masking member and provides a variable inlet pipe section for some distance along the passage which is selected to suit the characteristic of the particular design so as to provide a good ram effect which is boosted by the rapid port closure and is maintained over a wide speed range because of the near constant speed of the charge entry.

Movement is imparted to it by a crank arm 141 fixed to a shaft 140 which is rotated by a speed governor and which arm is connected by a linkage to a part fixed to the masking member, the arrangement being such that with increase of engine speed the passage is opened up to the flow of gases.

As will be seen from FIGURE 27 a plate 139 having an aperture therein which is shaped to provide the required timing characteristic as explained with reference to FIGURE 30 is secured to the ported structure 6 by screws 139*a* and the plate is so shaped as to provide shoulders 137*a* which form guides for the extension piece 137. The extension piece is also provided with a flange 137*b* (see FIGURE 29) which is guided in a slot 137*c* in the ported structure 6. The extension piece 137 and the masking member 136 are thus guided to move rectilinearly across the inlet passage.

Alternative methods of maintaining the flow of combustible gases constant over a range of engine speeds and at the same time adjusting the timing of the opening of the inlet port is shown in FIGURES 31 and 32. In FIGURE 31 the end of a masking member 187, controlled by means responsive to engine speed, is arranged to move across the inlet passage 192 in the direction of the rotation of the cylinder assemblage.

The masking member is in the form of a plate 187 which slides through a slot in a spindle 188 rotatably mounted in a part of the ported structure 6. The end of the plate is bent into an eye through which extends the rod 189, the ends of which engage slots 190 in cover plates 191 secured to the ends of a bore machined in the ported structure 6. The spindle 189 is also engaged between the arms of a fork on a lever arm 193 which is fixed to a spindle extending out through the cover plate 191. The slots 190 are so shaped that when the spindle is rotated the extremity of the plate 187 moves substantially in the direction of rotation of the cylinder assemblage, whereby the passage 192 between it and the inlet passage in the ported structure may be varied. The upper end 194 of the passage may be cylindrical and as indicated at 194*a* blends into the rectangular shape of the passage 192. It will be appreciated with this arrangement that in accordance with the position of the extremity of the masking member 187 the opening at the end of the cylinder will commence to overlap the passage 192 sooner or later during the rotation of the cylinder assemblage and thus vary the timing of the opening or closing of the inlet passage in the ported structure.

In the arrangement shown in FIGURE 32 the masking member, controlled by means responsive to engine speed, is formed in two parts 199, 202 which are hinged together at 202*a*. The free end of the part 202 is arranged to slide along guideways on one side of the inlet passage 196 in the ported structure 6. The free extremity of the part 199 has pivoted to it at 199*a* a shoe 195 which is guided to move along arcuate guideways 197, 198 which are concentric with the axis of rotation of the cylinder assemblage. A link 200 is connected at one end to the pin of the hinge 202*a* and is pivoted at 200*a* at the other end to the part of the ported structure 6. An actuating member 201 which is reciprocable in a bearing 201*a* in a part of the ported structure, is pivoted at 201*b* at its inner end to a link 201c which in its turn is pivoted at 201d to the part 199.

The arrangements shown in FIGURES 31 and 32 only control the timing of either the opening or the closing of an inlet port, but by duplicating the mechanisms with one located at each end of the port the timing of both the opening and the closing of the port may be varied. Also the arrangements shown in FIGURES 31 and 32 may be arranged to move the masking members across the inlet port in the ported structure in a direction transverse to the direction of rotation of the cylinder assemblage as described with reference to FIGURE 30, to control the timing of both the opening and closing of the inlet port.

I claim:

1. A rotary internal combustion engine including a component comprising:
    (a) a ported structure containing inlet and outlet passages for an inflowing charge and exhaust gases respectively,
    (b) another component comprising an assemblage of parts which together with the ported structure provide between them combustion spaces which vary in volume during a working cycle of the engine,
    (c) a number of sealing blades between the components of the ported structure and assemblage of parts and extending transversely to the direction of relative rotation between said components,
    (d) a mounting for said blades on at least one of said components and adapted to permit movement of the blades towards and away from the other component,
    (e) means for urging the blades towards said other component,
    (f) means for locating said blades at a predetermined distance from said other component.

2. A rotary engine according to claim 1 in which the means for locating the blades comprises followers supporting said blades engageable with a peripheral face of said other component.

3. A rotary engine according to claim 1 in which:
    (a) said component of the assemblage of parts has a peripheral face formed with ports which communicate with said combustion spaces,
    (b) said ported structure is provided with an internal peripheral face encircling and spaced away from said external peripheral face of said assemblage of parts, and said mountings for the blades comprise grooves in said external peripheral face.

4. A rotary engine according to claim 2 wherein:
    (a) each of said components is provided with transversely extending blades and the followers of which blades engage a peripheral face of said other component,
    (b) and means on the circumference of at least one of said components for moving said blades associated with that component clear of the blades on the other component when said blades approach one another during said relative rotation.

5. A rotary internal combustion engine according to claim 1 wherein said means for locating said blades at a predetermined distance from said other components comprise followers supporting said blades which are engageable with tracks encircling said other components, and wherein said means for urging the blades toward the other components comprise resilient elements.

6. A rotary engine according to claim 1 and in which:
    (a) said blades are mounted on a rotatable component of said assemblage of parts and have followers engageable with a peripheral track on said ported structure,
    (b) mountings for the blades are provided on the rotatable components permitting the blades and followers under centrifugal force to move outwardly maintaining the followers in engagement with said track.

7. A rotary engine according to claim 1 and in which:
    (a) said blades are disposed on a rotatable component of said assemblage of parts and have followers engageable with a peripheral track on said ported structure,
    (b) mountings for the blades are attached to the rotatable component permitting the blades and followers under centrifugal force to move outwardly maintaining the followers in engagement with said track,
    (c) loading means are associated with each follower and blade,
    (d) which blade and the mounting are so arranged that the centrifugal force on said loading means partly counterbalances the centrifugal force on the blade so as to reduce the pressure of the follower on said track.

8. A rotary engine according to claim 7 wherein said loading means comprises:
    (a) a rocker pivotally attached between its ends to said rotatable component of the assemblage of parts one end of which rocker is attached to a part moving with the blade,
    (b) a mass attached to the other end of the rocker whereby the moment of said mass about the pivot axis of the rocker partly counterbalances the moments of the blade and follower about said pivot axis so as to reduce the pressure of the follower on the track.

9. A rotary engine according to claim 1 wherein there are arranged on opposite sides of said combustion chambers pairs of cooperating and axially spaced sealing faces one sealing face of each pair being formed on the component of said assemblage of parts and the other sealing face of each pair being provided on said other component.

10. A rotary engine according to claim 9 wherein injection means are provided for injecting liquid under pressure between the sealing faces of each pair of sealing faces.

11. A rotary engine according to claim 1 wherein:
    (a) there are arranged on opposite sides of said combustion chambers pairs of cooperating sealing faces, one sealing face of each pair being formed on the component of said assemblage of parts and the other sealing face of each pair being provided on said other component,
    (b) means are provided for injecting liquid between said oppositely spaced sealing faces,
    (c) at least one of said components is provided with recesses for receiving sealing rings on which are formed the sealing faces of that component,
    (d) means are provided for urging the sealing rings on one of said components towards the other said component.

12. A rotary engine according to claim 11 wherein resilient means are provided between said ring and its associated component for urging the ring towards said other component.

13. A rotary engine according to claim 12 wherein said resilient means between the ring and its associated component comprise plungers slidable in bores in said component and spaced on either side of said combustion spaces the ends of which plungers engage said ring and are close fitting within the width of said recess to provide seals around the back of the sealing ring whereby the escape of high pressure gas is prevented and there are provided springs between said plungers and ends of their associated bores whereby the plungers are urged towards the sealing ring.

14. A rotary engine according to claim 11 wherein the face of the ring which is exposed to the pressure of the combustion gases is of greater area than the face of the ring exposed to the liquid film that withstands the pressure of the combustion gases.

15. A rotary engine according to claim 11 wherein at least one of the sealing faces of each pair of sealing faces is provided with recesses spaced around the said face which recesses reduce in depth in the direction of said relative rotation for causing localities of high pressure in the liquid between said sealing faces.

16. A rotary engine according to claim 15 wherein the sealing face which has recesses formed therein is also provided with recesses of greater depth communicating with the trailing end of the first said recesses with respect to the direction of relative rotation between the ported structure and assemblage of parts.

17. A rotary engine according to claim 11 wherein:
(a) the component of said assemblage of parts and the component of said ported structure provide between them an annular collection space arranged adjacent said opposed sealing faces for collecting the liquid leaking past said sealing faces towards the aforesaid combustion spaces,
(b) and a liquid release valve is associated with said annular space for releasing excess liquid therefrom.

18. A rotary engine according to claim 1 wherein each blade on a component of said assemblage of parts has associated therewith a follower which engages a track on the ported structure which track is arranged in an annular space between a component of said assemblage of parts and a component of said ported structure which space receives lubricating liquid escaping from the sealing faces.

19. A rotary engine according to claim 17 wherein said liquid release valve comprises one or more passages communicating with said annular space leading to compartments containing floats which with accumulation of liquid in the compartments, move to open drain passages for the escape of the liquid thus controlling the level of liquid in the annular space.

20. A rotary engine according to claim 11 wherein the relatively rotating surfaces of said components provide between them an annular space into which liquid may flow from the aforesaid sealing faces towards the combustion spaces and wherein scavenging means are provided for withdrawing the liquid from said space.

21. A rotary engine according to claim 20 wherein said scavenging means comprise an orifice formed in the surface of one of said relatively rotating surfaces between which surfaces liquid from said sealing faces passes to liquid collection galleries and wherein a passage extends from said orifice and communicates with said annular space.

22. A rotary engine according to claim 21 wherein said orifice is formed in the component of the assemblage of parts.

23. A rotary engine according to claim 21 wherein said component which is provided with said orifice is formed with a groove on the trailing side of the orifice leading to the liquid collection galleries.

24. A rotary engine according to claim 5 wherein said blades are mounted on said components of said assemblage of parts so that each combustion space is disposed between two blades one on the trailing side thereof and one on the leading side thereof, and which blades extend transversely to the direction of relative rotation between said two components and wherein the faces of the followers associated with those blades which are on the trailing side of the combustion faces and which faces engage the tracks on the component of the ported structure are provided with grooves extending between the trailing and leading sides of the followers and of sufficient size as to prevent excess liquid building up on the leading side of the follower.

25. A rotary internal combustion engine according to claim 1 wherein said means for locating said blades at a predetermined distance from said other component comprise followers supporting said blades which are engageable with peripheral tracks on said other component, and wherein said means for urging the blades towards the other component comprise resilient elements, which tracks are arranged in annular spaces between a component of said assemblage of parts and a component of said ported structure which spaces receive lubricating liquid escaping from the sealing faces and wherein said blades are mounted on said components of said assemblage of parts so that each combustion space is disposed between two blades one on the trailing side thereof and one on the leading side thereof, and which blades extend transversely to the direction of relative rotation between said two components and wherein the faces of the followers associated with those blades which are on the trailing side of the combustion faces and which faces engage the tracks on the component of the ported structure are provided with grooves extending between the trailing and leading sides of the followers and of sufficient size as to prevent liquid building up on the leading side of the follower, and wherein said means for withdrawing liquid from said tracks comprise a passage extending radially outwards through the assemblage of parts.

26. A rotary engine according to claim 25 wherein the part of the component of the assemblage of parts which is disposed between two combustion spaces and between two of the aforesaid blades is provided with passages extending radially outwards.

27. A rotary engine according to claim 1 wherein there are provided means for varying the effective size of at least the end of the inlet passage in said ported structure which is adjacent said assemblage of parts, and means responsive to engine speed for actuating the first said means whereby the speed of entry of the combustible charge into each combustion space is substantially constant over the whole range of speeds of the engine for any given throttle setting.

28. A rotary engine according to claim 27 wherein said means for varying the effective size of the inlet passage comprises a masking member adjustable across the passage.

References Cited

UNITED STATES PATENTS

| | | | |
|---|---|---|---|
| 1,042,675 | 10/1912 | Helmes | 123—44 |
| 1,315,897 | 9/1919 | Aber | 123—44 |
| 2,189,728 | 2/1940 | Daniels | 123—44 |
| 2,273,025 | 2/1942 | Dillstrom | 123—44 |
| 3,167,058 | 1/1965 | Czike et al. | 123—44 |
| 3,200,797 | 8/1965 | Dillenberg | 123—44 |
| 3,279,445 | 10/1966 | Karol | 123—44 |
| 1,602,018 | 10/1926 | Harvey | 123—44 |

WENDELL E. BURNS, *Primary Examiner.*